P. JOHNSON.
Flour Cooler.
No. 89,485.
Patented April 27, 1869.
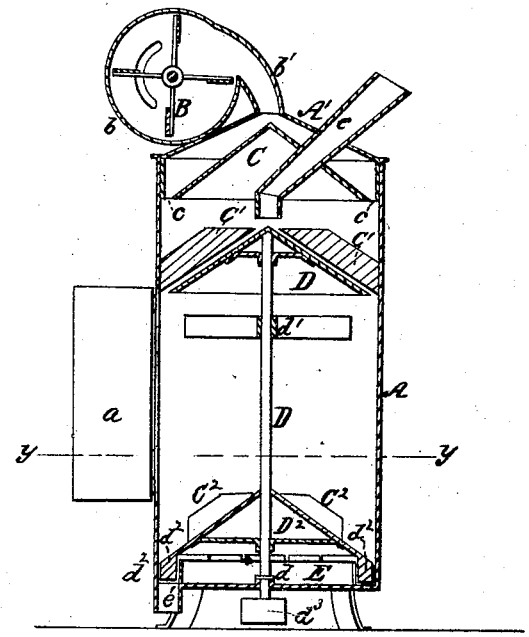
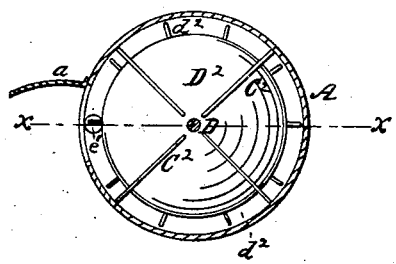
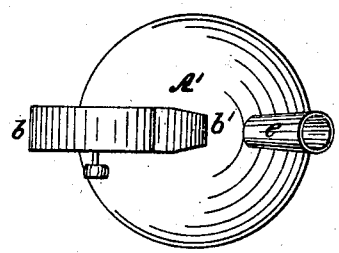

PETER JOHNSON, OF WAUCONDA, ILLINOIS.

Letters Patent No. 89,485, dated April 27, 1869.

IMPROVED FLOUR-COOLER.

The Schedule referred to in these Letters Patent and making part of the same.

*To all whom it may concern:*

Be it known that I, PETER JOHNSON, of Wauconda, in the county of Lake, and in the State of Illinois, have invented new and useful Improvements in Flour-Coolers; and I do hereby declare that the following is a full, clear, and exact description thereof, reference being had to the accompanying drawings, which make part of this specification, and in which—

Figure 1 represents a vertical section of my improved flour-cooler at the line $x\,x$ of fig. 2;

Figure 2, a horizontal section of the same at the line $y\,y$ of fig. 1; and

Figure 3, a plan or top view of the same.

The object of my invention is to provide a simple and efficient device for cooling flour, in order that the same may be expeditiously and safely packed after being bolted, to which ends my improvements consist in a case or chest, connected at top with a fan-blower, by which cool air is forced to its interior, and provided with a deflecting cone and series of partitions, by which the same is caused to act equally upon the whole mass of flour supplied to the chest.

A revolving shaft, carrying cones, upon which the flour falls, separates and distributes the same, thoroughly exposing it to the action of the cool air, and a series of conveyers attached to the periphery of the lower cone, sweeps it into a discharge-spout, from which it is removed for packing.

In the accompanying drawings, which show a convenient arrangement of parts for carrying out the objects of my invention—

A represents a case or chest, to which the flour is supplied as it comes from the bolts by the spout $e$.

A fan-blower, B, revolving in a casing, $b$, supplies cool air to the chest through an air-trunk, $b'$, connected to its cap, A'.

A short distance below the cap A', a stationary deflecting cone, C, is secured, the diameter of which is such as to leave a small annular space, $c$, between its periphery and the inside of the chest, through which the cool air from the blower enters equally in all directions.

A central shaft, D, mounted in bearings, $d\,d'$, is rotated by the application of suitable power to the pulley $d^3$, on its lower end, and carries two cones, D D', above which are arranged the series of stationary partitions $C^1\,C^2$, respectively.

These partitions serve to divide the currents of cool air and cause them to act equally upon the whole mass of flour passing through the machine.

The flour from the spout $e$ falls upon the upper revolving cone D', and from thence into a trough, E, at the bottom of the case, within which rotate conveyers $d^2$, attached to the periphery of the lower cone $D^2$, which sweep it into the discharge-spout $e'$, from which it is removed to be packed.

The flour which drops upon the lower cone $D^2$ is further agitated thereby, and it will be seen that the action of the revolving cones is to minutely divide the mass of flour and thoroughly expose it to the cool air forced in from above during its passage through the case.

Access to the interior is afforded when necessary by an opening, which is closed by a door, $a$.

Having thus fully described my invention,

What I claim therein as new, and desire to secure by Letters Patent, is—

1. The fan-blower B, in combination with the deflecting cone C, partitions $C^1\,C^2$, and case A, substantially as and for the purpose set forth.

2. The shaft D and cones $D^1\,D^2$, in combination with the fan-blower B, spout $e$, and conveyers $d^2$, the whole arranged and operating substantially as and for the purposes set forth.

The above specification signed by me, this 9th day of February, 1869.

PETER JOHNSON.

Witnesses:
JACOB W. BREWSTER,
HARRISON HILL.